(12) United States Patent
Chang

(10) Patent No.: US 8,061,204 B2
(45) Date of Patent: Nov. 22, 2011

(54) ACCELEROMETER

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 637 days.

(21) Appl. No.: 12/202,582

(22) Filed: Sep. 2, 2008

(65) Prior Publication Data

US 2009/0241667 A1    Oct. 1, 2009

(30) Foreign Application Priority Data

Mar. 25, 2008    (CN) .......................... 2008 1 0300705

(51) Int. Cl.
*G01P 15/093*    (2006.01)
(52) U.S. Cl. ................................. 73/514.26; 250/231.1
(58) Field of Classification Search ............... 73/514.26, 73/514.19, 653; 250/231.1, 231.11
See application file for complete search history.

(56) References Cited

U.S. PATENT DOCUMENTS

| | | | |
|---|---|---|---|
| 3,789,674 A * | 2/1974 | Anderson et al. .......... | 73/514.26 |
| 3,798,454 A * | 3/1974 | Weiss ........................ | 250/231.1 |
| 5,936,294 A * | 8/1999 | Zhang ........................ | 257/435 |
| 6,350,983 B1 * | 2/2002 | Kaldor et al. .............. | 250/231.1 |
| 2004/0060355 A1 | 4/2004 | Nemirovsky et al. | |

* cited by examiner

*Primary Examiner* — John Chapman, Jr.
(74) *Attorney, Agent, or Firm* — Altis Law Group, Inc.

(57) ABSTRACT

An accelerometer includes a substrate having a surface and a movable electrode. The movable electrode is mounted on the surface of the substrate and movable along an axis substantially parallel to the surface of the substrate in response to acceleration. A light-permeable region is defined in the movable electrode. A plurality of photosensitive regions and a plurality of non-photosensitive regions are defined in the surface of the substrate. The photosensitive regions and the non-photosensitive regions are spatially separated. The light-permeable region overlies only a portion of one of the non-photosensitive regions when at rest, and the light-permeable region overlies a portion of at least one of the photosensitive regions when the accelerometer is subjected to acceleration, such that the corresponding photosensitive region generates an output current.

17 Claims, 4 Drawing Sheets

ACCELEROMETER

BACKGROUND

1. Technical Field

The invention relates generally to semiconductors, and particularly to an accelerometer.

2. Description of Related Art

Conventionally, micro-machined accelerometers utilize a movable electrode for a motion sensing capacitor. The electrode is deflected toward or away from a stationary electrode in response to acceleration.

The measured capacitance between the movable electrode and the stationary electrode is dependent upon numerous factors including the distance between the movable electrode and the stationary electrode. The sensitivity of the conventional micro-machined accelerometer is also dependent upon the area of the movable electrode that overlaps the stationary electrode and further upon the magnitude of the measured capacitance. Increase in the measured capacitance can increase the sensitivity of the conventional accelerometer, but requires an increase in the distance between the movable electrode and the stationary electrode, with corresponding increase in the volume of the accelerometer. Accordingly, sensitivity of the conventional accelerometer is limited by the volume of the accelerometer.

What is needed, therefore, is a micro-machined accelerometer with reduced sensitivity to the distance between the movable electrode and the stationary electrode.

SUMMARY

An accelerometer includes a substrate having a surface and a movable electrode. The movable electrode is mounted on the surface of the substrate and movable along an axis substantially parallel to the surface of the substrate in response to acceleration acting on the accelerometer. A light-permeable region is defined in the movable electrode. A plurality of photosensitive regions and a plurality of non-photosensitive regions are defined in the surface of the substrate. The photosensitive regions and the non-photosensitive regions are spatially separated. The light-permeable region overlies only a portion of one of the non-photosensitive regions when the accelerometer is at rest, and the light-permeable region overlies a portion of at least one of the photosensitive regions when the accelerometer is subjected to acceleration, such that the corresponding photosensitive region generates an output current.

BRIEF DESCRIPTION OF THE DRAWINGS

The components in the drawing are not necessarily drawn to scale, the emphasis instead being placed upon clearly illustrating the principles of the present invention.

Corresponding reference characters indicate corresponding parts. The exemplifications set out herein illustrate at least one present embodiment of the accelerometer, in one form, and such exemplifications are not to be construed as limiting the scope of the invention in any manner.

DETAILED DESCRIPTION OF THE EMBODIMENT

Reference will now be made to the drawings to describe embodiments of the present accelerometer in detail.

Figure 1:
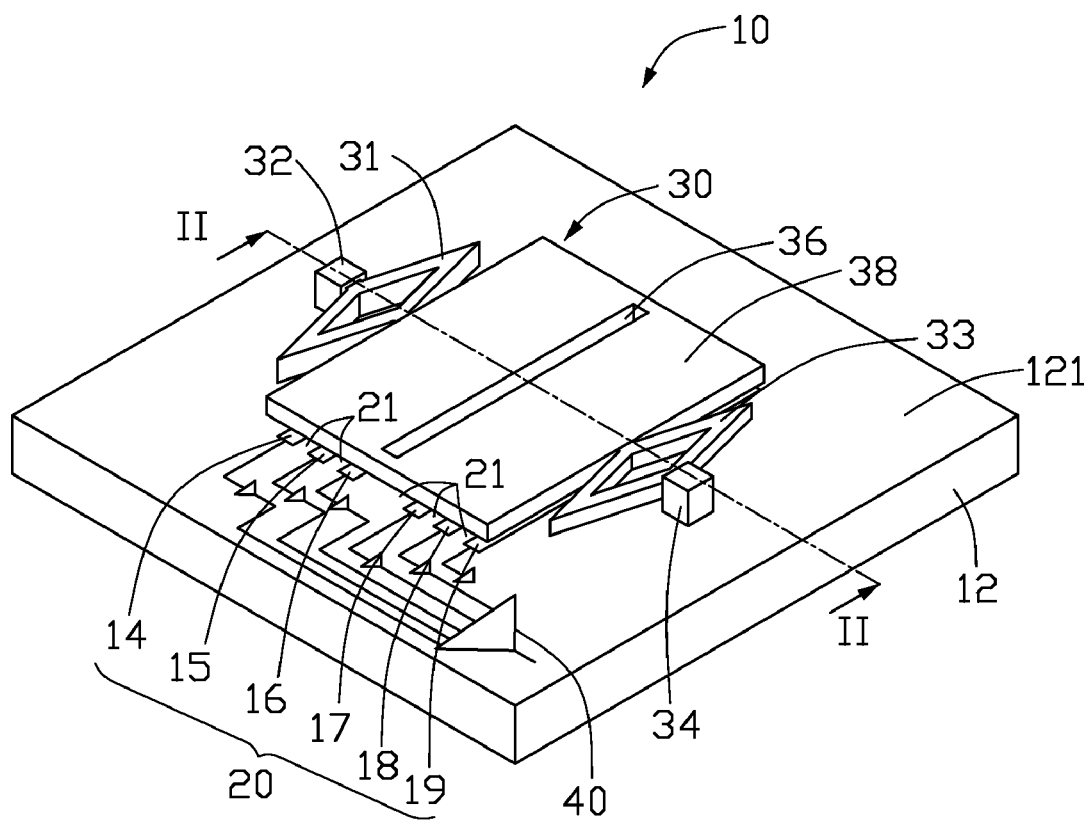
FIG. 1 is an isometric view of an accelerometer in accordance with a first embodiment of the present invention.
Figure 2:
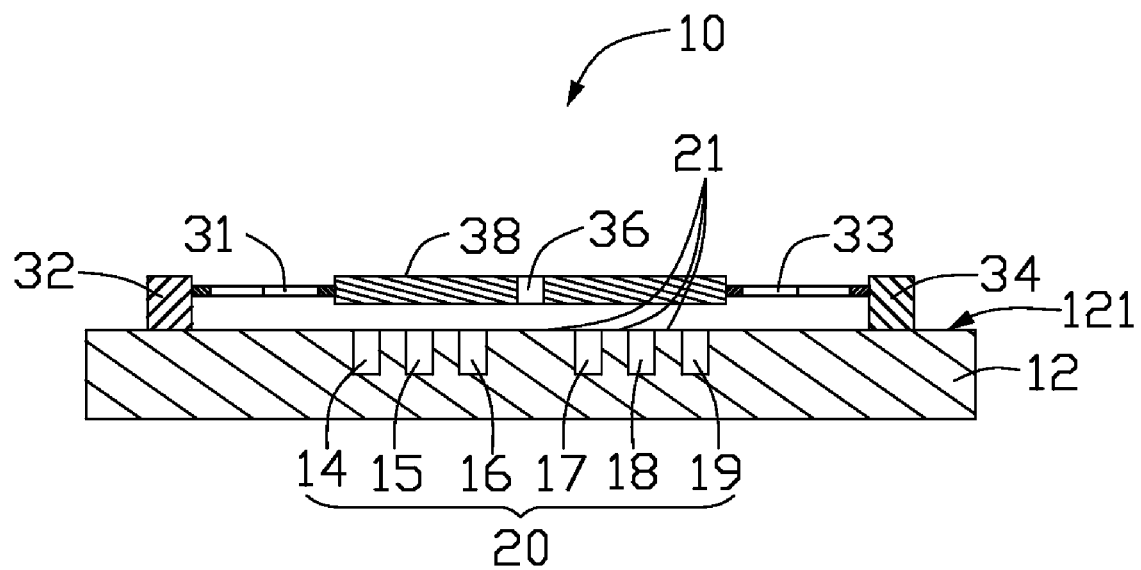
FIG. 2 is a cross-section taken along line II-II of FIG. 1.

As shown in FIGS. 1 and 2, an accelerometer chip 10 in accordance with a first embodiment includes a substrate 12 having a surface 121, a photosensitive region 20 and a non-photosensitive region 21 formed thereon, and a movable electrode 30 overlying the photosensitive region 20 and the non-photosensitive region 21. The accelerometer chip 10 serves as a sensor detecting the motion of the movable electrode 30 to measure acceleration.

The accelerometer chip 10 further includes an integrated circuit 40 (FIG. 1) to form an integrated sensor component. Because the circuit 40 can have many different structures, the structure shown is only for the purpose of illustrating the circuit 40, which is electrically coupled to the photosensitive region 20 to receive electrical signals therefrom.

The substrate 12 can be silicon or other semiconductor material. The photosensitive region 20 can be formed in the surface 121 using a complementary metal oxide semiconductor (CMOS) technique or other techniques known in the art. In the present embodiment, the photosensitive region 20 is a photo-detector array. It is understood that the photo-detector can be a light-sensitive device such as a transistor, a photo-diode, or a photomultiplier.

In the present embodiment, the photosensitive region 20 includes six parallel photo-detectors 14, 15, 16, 17, 18, 19, each having a rectangular cross-section of substantially the same size. Regions between adjacent photo-detectors 14, 15, 16, 17, 18, 19 constitute the non-photosensitive regions 21, a material of which is similar to that of the substrate 12.

In the present embodiment, the distance between the photo-detector 16 and the photo-detector 17 exceeds or equals the distance between any other neighboring photo-detectors. The distance between the photo-detector 14 and the photo-detector 15 substantially equals the distance between the photo-detector 15 and the photo-detector 16. The distance between the photo-detector 17 and the photo-detector 18 substantially equals the distance between the photo-detector 18 and the photo-detector 19.

The movable electrode 30 is a movable structure that acts as an optical shutter. The movable electrode 30 is coupled to and mounted over the photosensitive region 20 and the non-photosensitive region 21. The movable electrode 30 is movable relative to the photo-detectors 14, 15, 16, 17, 18, 19 and the substrate 12. The movable electrode 30 has cantilever beams or arms 32, 34 that support or suspend a portion of the movable electrode 30 over the photosensitive region 20 and the non-photosensitive region 21. In the present embodiment, the movable electrode 30 is substantially rectangular and parallel to the surface 121 of the substrate 12. Two cantilever beams 32, 34 are connected to opposite sides of the movable electrode 30. Examples of suitable movable electrode materials include, but are not limited to, polysilicon, aluminum, tungsten, gold, or nickel.

In FIGS. 1 and 2, the movable electrode 30 includes a light permeable region 36 and a light shading region 38. The light permeable region 36 is a rectangular region defined in the middle of the movable electrode 30. In the present embodiment, the light permeable region 36 is a rectangular slot. In alternative embodiments, the light permeable region 36 can be a rectangular glass. The width of the light permeable region 36 substantially equals the width of each of the photo-detectors 14, 15, 16, 17, 18, 19. The light permeable region 36 is configured for allowing light to reach portions of the photo-detectors 14, 15, 16, 17, 18, 19 to generate an output current. Furthermore, although the light permeable region 36 here has a rectangular cross-section, the light permeable region 36 of the movable electrode 30 can have other suitable cross-sections such as, for example, circular or oval. The two cantilever beams 32, 34 are aligned along an axis perpendicular to a lengthwise direction of the light permeable region 36.

A first resilient element 31 is connected between the cantilever beam 32 and the movable electrode 30. A second resilient element 33 is connected between the cantilever beam 34 and the movable electrode 30. The first resilient element 31 and the second resilient element 33 are aligned perpendicular to the extension axis of the photo-detectors 14, 15, 16, 17, 18, 19. The resilient elements 31, 32 can be springs. In the present embodiment, both of the resilient elements 31, 32 are diamond-shaped resilient plates including four metal straps interconnected with one another.

When no acceleration acts on the movable electrode 30, the light permeable region 36 overlies only a portion of the non-photosensitive region 21. More specifically, the light permeable region 36 overlies only a portion of the region or area between the photo-detector 16 and the photo-detector 17.

When acceleration moves the movable electrode 30 perpendicular to the extension axis of the photo-detectors 14, 15, 16, 17, 18, 19, a portion of at least one of the photo-detectors 14, 15, 16, 17, 18, 19 is exposed to a light beam by the light permeable region 36 of the movable electrode 30, and consequently, the exposed photo-detector generates an output current. For example, initially, as a portion of the photo-detector 16 is exposed to a light beam by the light permeable region 36, the photo-detector 16 generates a first current. Next, a portion of the photo-detector 15 is exposed to a light beam by the light permeable region 36, and the photo-detector 15 generates a second current. The differences in the changes of the two currents are used by the integrated circuit 40 to precisely and accurately measure the acceleration. As an example, the integrated circuit 40 can include a differential amplifier, as known in the art, coupled to the photo-detectors 14, 15, 16, 17, 18, 19.

Therefore, in accordance with the exemplary embodiment, the improved accelerometer as provided is less sensitive to the exact distance between the movable electrode 30 and an underlying substrate 12 or electrode, with the movable electrode 30 described acting as a shutter or a light shield allowing selectively incidence of light on portions of the photo-detectors 14, 15, 16, 17, 18, 19 to generate different output currents. The differences in the charges generated by different photo-detectors 14, 15, 16, 17, 18, 19 can be used to measure the acceleration.

Figure 3:
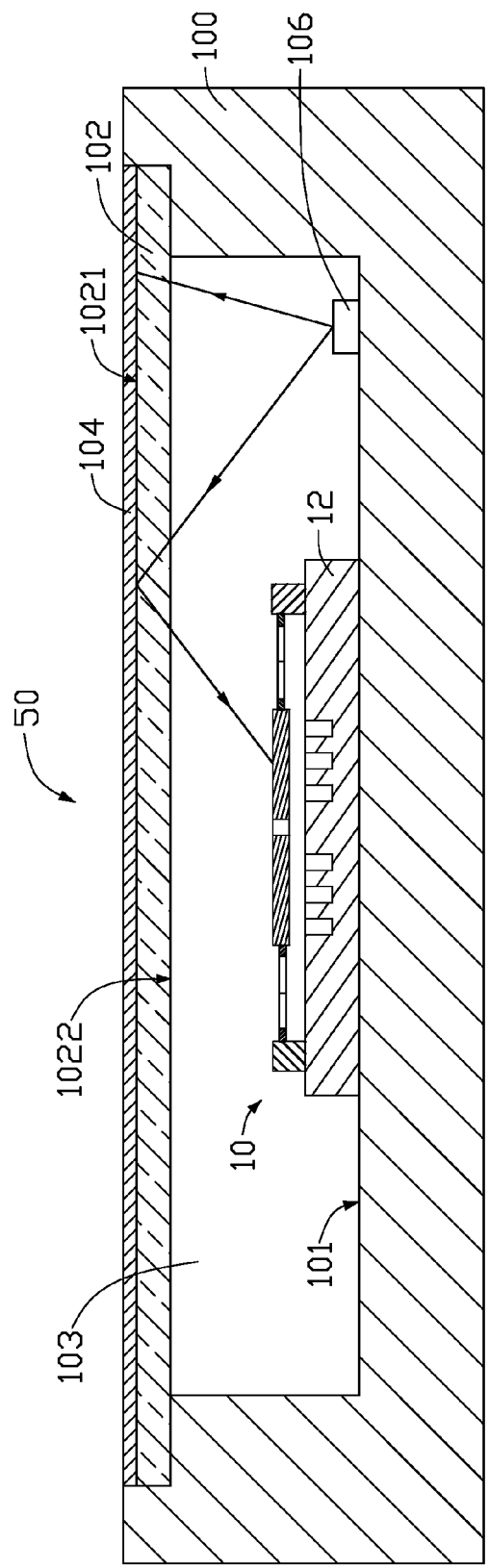
FIG. 3 is a cross-section of an accelerometer in accordance with a second embodiment of the present invention.

As shown in FIG. 3, an accelerometer 50 in accordance with a second embodiment includes a base 100 having a receiving space 103 defined therein, the accelerometer chip 10 received in the receiving space 103, and a cover plate 102 covering the opening of the receiving space 103.

The receiving space 103 includes a bottom surface 101 on the base 100. The substrate 12 of the accelerometer chip 10 is wire bonded onto the bottom surface 101. A light source 106 is die bonded onto the bottom surface 101. It is understood that the accelerometer chip 10 and the light source 106 can be bonded on the bottom surface 101 by other bonding techniques known in the art. In the present embodiment, the light source 106 is a light emitting diode (LED). The light source 106 also can be an LED array.

The cover plate 102 is a glass plate having an inner surface 1022 and an outer surface 1021 opposite thereto. The inner surface 1022 faces the receiving space 103. A reflective film 104 is formed on the outer surface 1021. The reflective film 104 can be metal film or a dielectric coating film. The reflective film 104 is configured for reflecting light rays emitted from the light source 106 to the accelerometer chip 10. The reflective film 104 also can be formed on the inner surface 1022.

Figure 4:
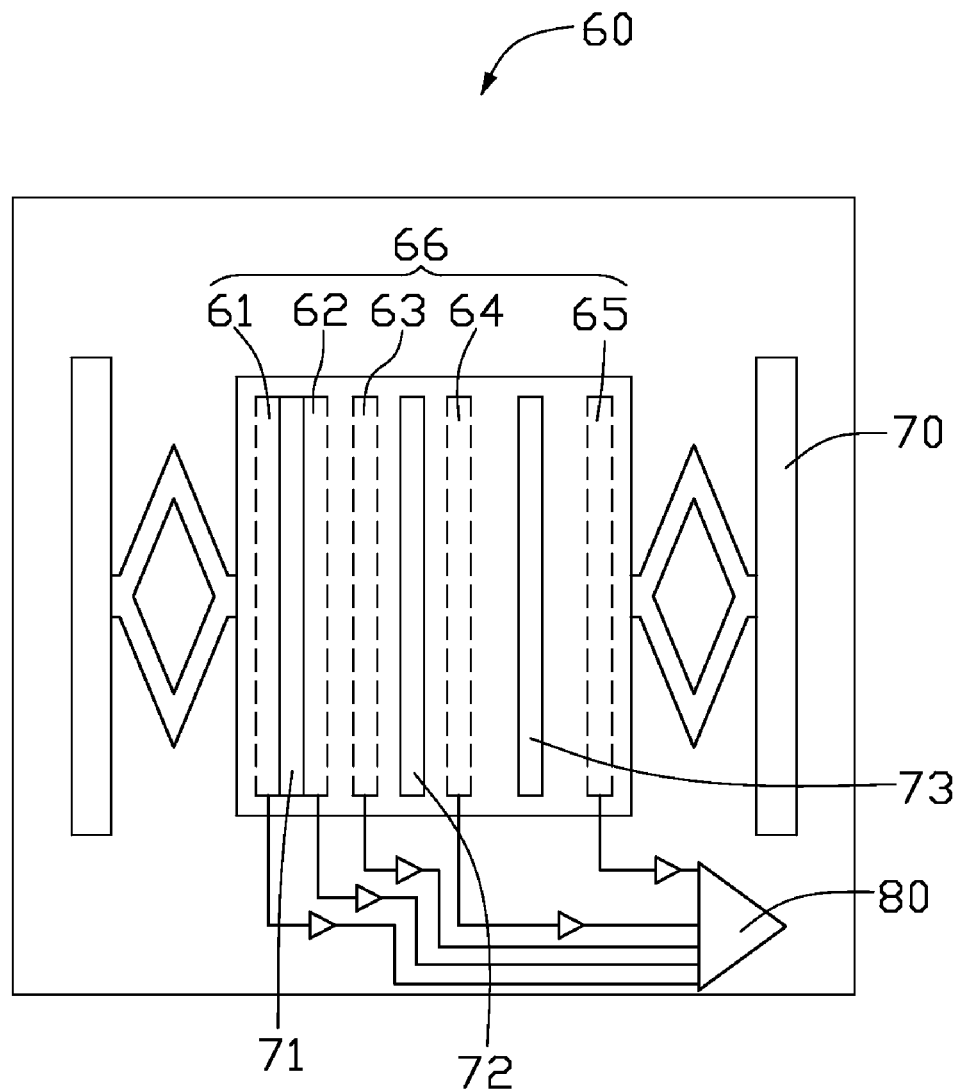
FIG. 4 is a top view of an accelerometer in accordance with a third embodiment of the present invention.

FIG. 4 shows an accelerometer chip 60 in accordance with a third embodiment, differing from the accelerometer chip 10 of the first embodiment only as follows. The difference is that the movable electrode 70 includes three light permeable regions 71, 72, 73. The light permeable regions 71, 72, 73 are substantially the same size and shape, and substantially rectangular and parallel. The photosensitive region 66 includes five parallel photo-detectors 61, 62, 63, 64, 65 having rectangular cross-sections of substantially the same size. The distance between the photo-detector 61 and the photo-detector 62 is equal to the width of the light permeable region 71. The distance between the photo-detector 63 and the photo-detector 64 is triple the width of the light permeable region 72. The distance between the photo-detector 64 and the photo-detector 65 is five times the width of the light permeable region 73. The two cantilever beams 32, 34 are aligned along an axis parallel to the arrangement direction of the photo-detectors 61, 62, 63, 64, 65.

When no acceleration acts on the movable electrode 70, the light permeable region 71 overlies only a portion of the region or area between the photo-detector 61 and the photo-detector 62. The light permeable region 72 overlies only a portion of the region or area between the photo-detector 63 and the photo-detector 64. The light permeable region 73 overlies a portion of the region or area between the photo-detector 64 and the photo-detector 65.

When acceleration acts on the movable electrode 70 perpendicular to the extension axis of the photo-detectors 61, 62, 63, 64, 65, a portion of at least one of the photo-detectors 61, 62, 63, 64, 65 is exposed to a light beam by the at least one of the light permeable regions 71, 72, 73 of the movable electrode 70, and consequently generates an output current. When the acceleration is small, the movement of the movable electrode 70 relative to the substrate 12 is also small, and the photo-detector 61 or the photo-detector 62 may generate an output current. When the acceleration is large, the movement of the movable electrode 70 relative to the substrate 12 is also large, and the photo-detector 63 or the photo-detector 64 may generate an output current. The differences in the charges generated by the photo-detectors are used by the integrated circuit 80 to precisely and accurately measure the acceleration. It is to be understood that the width ratio compared to the distance between two neighboring photo-detectors 61, 62, 63, 64, 65 and the distance between two neighboring light permeable regions 71, 72, 73 can be varied according to needs.

What is claimed is:

1. An accelerometer, comprising:
    a substrate having a surface,
    a movable electrode mounted on the surface of the substrate, being movable along an axis substantially parallel to the surface of the substrate in response to acceleration acting thereon,
    a light-permeable region defined in the movable electrode,
    a plurality of photosensitive regions and a plurality of non-photosensitive regions defined in the surface of the substrate, the photosensitive regions and the non-photosensitive regions being spatially separated, each of the photosensitive regions comprising a photo-detector,
    a first cantilever beam and a second cantilever beam respectively connected to opposite sides of the movable electrode and configured for supporting a portion of the movable electrode over the surface of the substrate, the two cantilever beams mounted on the surface of the substrate and aligned along an axis perpendicular to a lengthwise direction of the light permeable region,
a first resilient element connected between the first cantilever beam and the moveable electrode and a second resilient element connected between the second cantilever beam and the moveable electrode, the two resilient elements being aligned perpendicular to an extension axis of the photo-detectors,
a base having a receiving space defined therein and a cover plate covering the opening of the receiving space, the receiving space comprising a bottom surface on the base, and the substrate and the movable electrode received in the receiving space, and
a light source die bonded on the bottom surface,
wherein the light-permeable region overlies only a portion of one of the non-photosensitive regions when the accelerometer is at rest, and the light-permeable region overlies a portion of at least one of the photosensitive regions when the accelerometer is subjected to acceleration, such that the corresponding photosensitive region generates an output current.

2. The accelerometer as claimed in claim 1, wherein the substrate is semiconductor material.

3. The accelerometer as claimed in claim 1, wherein the movable electrode is metal.

4. The accelerometer as claimed in claim 1, wherein each resilient element is diamond shaped and comprises four interconnected metal straps.

5. The accelerometer as claimed in claim 1, wherein the substrate is wire bonded on the bottom surface.

6. The accelerometer as claimed in claim 1, further comprising a reflective film formed on one surface of the cover plate.

7. An accelerometer, comprising:
a substrate having a surface,
a movable electrode mounted on the surface of the substrate, being movable along an axis substantially parallel to the surface of the substrate in response to acceleration acting on the accelerometer,
a plurality of light-permeable regions defined in the movable electrode, and spaced evenly apart,
a plurality of photosensitive regions and a plurality of non-photosensitive regions defined in the surface of the substrate, the photosensitive regions and the non-photosensitive regions spatially separated and parallel to the arrangement of the light-permeable regions, and
a first cantilever beam and a second cantilever beam respectively connected to opposite sides of the movable electrode and configured for supporting a portion of the movable electrode over the surface of the substrate, wherein the two cantilever beams are aligned along an axis parallel to the arrangement direction of the light-permeable regions,
wherein a distribution density of the photosensitive regions gradually increases with distance from the photosensitive regions nearest to the first cantilever beam, each of the light-permeable regions overlying only a portion of respective non-photosensitive regions when the accelerometer is at rest, and at least one of the light-permeable regions overlying a portion of at least one of the photosensitive regions when the accelerometer is subjected to acceleration.

8. The accelerometer as claimed in claim 7, wherein the substrate is semiconductor material.

9. The accelerometer as claimed in claim 7, wherein the movable electrode is metal.

10. The accelerometer as claimed in claim 7, wherein each of the photosensitive regions comprises a photo-detector.

11. The accelerometer as claimed in claim 7, further comprising a resilient element connected between at least one of the cantilever beams and the movable electrode.

12. The accelerometer as claimed in claim 11, wherein the resilient element is diamond shaped and comprises four metal straps interconnected with one another.

13. An accelerometer, comprising:
a substrate having a surface,
a movable electrode mounted on the surface of the substrate, being movable along an axis substantially parallel to the surface of the substrate in response to acceleration acting thereon,
a light-permeable region defined in the movable electrode,
a plurality of photosensitive regions and a plurality of non-photosensitive regions defined in the surface of the substrate, the photosensitive regions and the non-photosensitive regions being spatially separated,
a base having a receiving space defined therein and a cover plate covering the opening of the receiving space, the receiving space bounded by a bottom surface on the base, the substrate and the movable electrode received in the receiving space, and the substrate wire bonded on the bottom surface, and
a light source die bonded on the bottom surface,
wherein the light-permeable region overlies only a portion of one of the non-photosensitive regions when the accelerometer is at rest, and the light-permeable region overlies a portion of at least one of the photosensitive regions when the accelerometer is subjected to acceleration, such that the corresponding photosensitive region generates an output current.

14. The accelerometer as claimed in claim 13, wherein each of the photosensitive regions comprises a photo-detector.

15. The accelerometer as claimed in claim 13, further comprising two cantilever beams connected to opposite sides of the movable electrode and configured for supporting a portion of the movable electrode over the surface of the substrate, the two cantilever beams being aligned along an axis parallel to the arrangement of the photosensitive regions.

16. The accelerometer as claimed in claim 15, further comprising a resilient element connected between at least one of the cantilever beams and the movable electrode, wherein the resilient element is diamond shaped and comprises four interconnected metal straps.

17. The accelerometer as claimed in claim 13, further comprising a reflective film formed on one surface of the cover plate.

* * * * *